United States Patent [19]

Kimura et al.

[11] Patent Number: 4,884,189
[45] Date of Patent: Nov. 28, 1989

[54] LOCUS INTERPOLATION DEVICE

[75] Inventors: Kaoru Kimura; Masanori Nishi, both of Kitakyushu; Yoshikatsu Minami, Nakama, all of Japan

[73] Assignee: Kabushiki Kaisha Yaskawa Denki Seisakusho, Kitakyushu, Fukuoka, Japan

[21] Appl. No.: 100,863

[22] Filed: Sep. 25, 1987

[30] Foreign Application Priority Data

Oct. 6, 1986 [JP] Japan .................. 61-237517
Aug. 28, 1987 [JP] Japan .................. 62-214896

[51] Int. Cl.$^4$ .................. G05B 19/18; G06F 15/46
[52] U.S. Cl. .................. 364/474.31; 364/513; 364/167.01; 901/41
[58] Field of Search ............ 364/169, 513, 577, 472, 364/474.31, 475; 318/568, 640, 569, 567; 901/41, 30, 29, 50

[56] References Cited

U.S. PATENT DOCUMENTS

| | | | |
|---|---|---|---|
| 4,550,383 | 10/1985 | Sugimoto | 364/513 |
| 4,590,577 | 5/1986 | Nio et al. | 364/513 |
| 4,600,869 | 7/1986 | Sekine et al. | 364/474 |
| 4,698,777 | 10/1987 | Toyoda et al. | 364/513 |
| 4,706,204 | 11/1987 | Hattori | 364/169 |

*Primary Examiner*—Jerry Smith
*Assistant Examiner*—Paul Gordon
*Attorney, Agent, or Firm*—Beveridge, DeGrandi & Weilacher

[57] ABSTRACT

A locus interpolation device characterized in that the device is attached to an end of a wrist of a movable structure such as a robot, with a tool supported by the device, and a circular or noncircular locus is interpolated by controlling the operation of the tool independently from that of the movable structure.

7 Claims, 9 Drawing Sheets

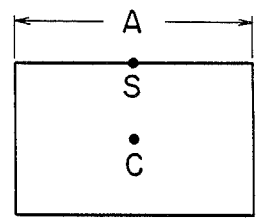
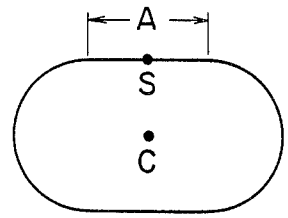
FIG. 5(a)   FIG. 5(b)
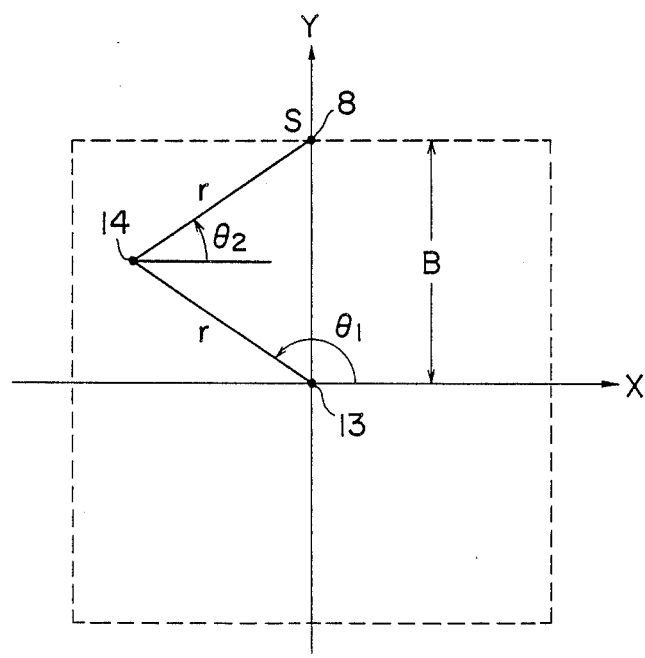
FIG. 6

LOCUS INTERPOLATION DEVICE

BACKGROUND OF THE INVENTION

This invention relates to a device adapted to be secured to a movable structure such as the wrist of a robot, and to control a tool supported by the device so as to interpolate a locus of a circular or noncircular configuration.

In the case of producing a body portion of an automobile or parts to be installed thereon, it is required to form numerous holes of circular, oval, rectangular and other configurations for inserting machine screws, bolts and other instruments through these holes. Although it is an ordinary practice to form these holes by means of a punch press and the like, in the case of 3-dimensional products such as a body portion of the automobile, setting of the punch press is not easy, and furthermore, the configuration and the size of the products are different due to model change and different type of the motor vehicle. For this reason, the application of the punch press is not easy, and therefore use of a robot for forming these holes is now prevalent. FIG. 18 shows a robot adapted to form these holes. The robot has a plurality of arms such as those designated by 1a and 1b having a number of degrees of freedom corresponding thereto. A tool 2 is supported by a wrist of the robot provided subsequent to the last arm. The tool 2 may be any of a laser gun, plasma gun, water-jet gun and the like, a small hole 4 is thereby formed through a work 3 of a 3-dimensional configuration according to an arc-interpolation procedure under the control of a robot controller operating at a high speed. Holes of a polygonal shape or an elongated circular and rectangular shape may also be produced by combining a linear interpolation, circular interpolation and the like.

However, the locus interpolation controlled by the robot exhibits difficulties in its slow operation speed and time delay caused by the following reasons.

(1) The peripheral speed required for forming these holes, which is determined by the operational characteristics of the tool, is much faster than the control speed of the robot.

(2) The diameter of the hole to be formed is in a range of 4-20 mm, and hence arc-interpolation is extremely difficult.

(3) In a case of a construction where the tool is controlled in a noncircular locus interpolation with respect to two coordinate axes (such as X-Y tables) perpendicular to each other, the size of the unit becomes large, cost of the production becomes high, and installation of cables operating the tool and motors becomes difficult.

SUMMARY OF THE INVENTION

The object of the present invention is to provide a locus interpolation device which can eliminate the above described difficulties of the conventional devices, and a locus interpolation control of a circular or noncircular configuration can be carried out independently from a movable structure such as a robot.

The above described object of the invention can be achieved by a locus interpolation device characterized in that the device is attached to an end of a wrist of a movable structure for supporting a tool, and a circular or noncircular locus is interpolated by controlling the operation of the tool independently from that of the movable structure.

BRIEF DESCRIPTION OF THE DRAWINGS

In the drawings:

FIG. 5(a) and 5(b) are diagrams for explaining data required for forming locus in the case of forming a rectangular hole and an elongated hole (noncircular holes);

FIG. 6 is a diagram showing a relation between the centers of rotation of a $T_1$ shaft and a $T_2$ shaft at the time of starting a noncircular hole forming operation;

DESCRIPTION OF PREFERRED EMBODIMENTS

Before entering the description of the embodiments, a general arrangement and the principle of the invention will be described.

Figure 1:
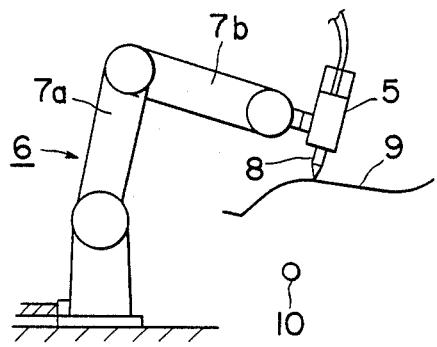
FIG. 1 is an elevational view showing a basic construction of the invention.

The locus interpolation device of this invention is secured to an end of a wrist of a robot 6 having a number of arms 7a and 7b and hence having a number of degrees of freedom as shown in FIG. 1. The device seizes a tool 8 and operates the same independently from the robot 6. The tool 8 is of a type noncontact with a work 9 through which a small hole 10 of a predetermined diameter is to be formed at a predetermined position. When the work 9 is of a 3-dimensional configuration, five degrees of freedom are required for the robot 6, and further two degrees of freedom are required for the locus interpolation device 5 for effecting a circular movement and a radius setting operation.

In a case where the work 9 has a planar configuration, the robot 6 operable at 3 degrees of freedom is sufficient, and hence the entire system requires 5 degrees of freedom. The tool supported by the locus interpolation device may be any of YAG laser gun, $CO_2$ gas laser gun, plasma gun, water jet gun and the like. The locus interpolation device 5 is basically of a type in which data related to a tool shifting speed and a radius of the circular movement or a longer side measurement of a noncircular hole configuration are given numerically, and these can be varied automatically. The function of determining the shifting speed and the shifting locus is made independent from the basic operation of the robot 6, and the operation of the device is controlled by a control portion (not shown) of the device 5.

Figure 2:
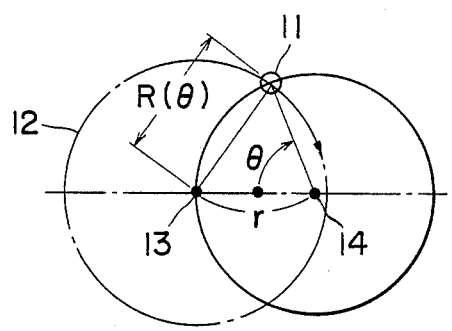
FIG. 2 is a diagram showing locus for determining circular movements of the present invention.
Figure 3:
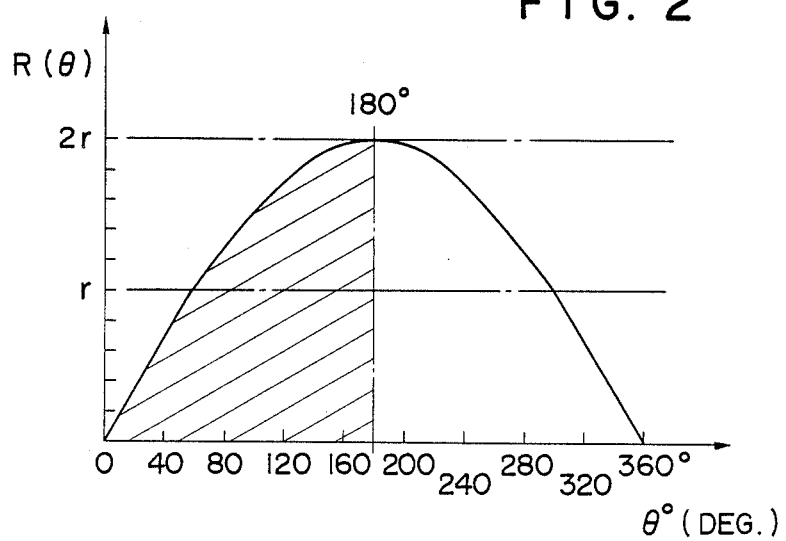
FIG. 3 is a characteristic curve showing a relation between the rotating angle and the radius of a circular movement.

The principle of interpolating a circular locus will now be explained with reference to FIGS. 2, 3 and 4. FIG. 2 illustrates an operation locus in the case of forming a circular hole, and FIG. 3 illustrates a characteristic curve showing a relation between the rotating angle and the radius of a circular movement required for forming a circular hole.

In FIG. 2, numeral 11 designates a $T_2$ shaft constituting an operational shaft holding the tool 8 and rotated around a point 14. Numeral 12 designates a locus of rotation of a $T_1$ shaft constituting a rotating shaft that rotates the $T_2$ shaft 11 around its center of rotation 13. The distance between the center of rotation 13 of the $T_1$ shaft and the center of rotation 14 of the $T_2$ shaft is selected to be equal to a maximum value of the radius $\gamma$ determined by the specification of the device, and the $T_2$ shaft 11 holding the tool is departed from its center of rotation 14 by the radius $\gamma$. It should be noted that when the $T_2$ shaft 11 is rotated around the point 13, the center 14 is also rotated around the point 13. Accordingly, the distance $R(\theta)$ between the $T_2$ shaft 11 and the center of rotation 13 of the $T_1$ shaft constitutes an information related to the radius of the circular movement of the tool (corresponding to the radius of the small hole to be formed), which is given to a control portion (not shown) of the locus interpolation device. The value of $R(\theta)$ can be determined from the rotating angle $\theta$ of the $T_2$ shaft 11 in accordance with the following equation (1).

$$R(\theta) = \sqrt{(\gamma\sin\theta)^2 + (\gamma - \gamma\cos\theta)^2} \quad (1)$$
$$= \gamma\sqrt{\sin^2\theta + 1 + \cos^2\theta - 2\cos\theta}$$
$$= \gamma \cdot \sqrt{2} \cdot \sqrt{1 - \cos\theta}$$

Thus, the rotating angle $\theta$ of the $T_2$ shaft can be determined reversely from the following equation (2).

$$\left(\frac{R(\theta)}{\gamma\sqrt{2}}\right)^2 = 1 - \cos\theta \quad (2)$$
$$\cos\theta = 1 - \left(\frac{R(\theta)}{\gamma\sqrt{2}}\right)^2$$
$$\theta = \cos^{-1}\left[1 - \left(\frac{R(\theta)}{\gamma\sqrt{2}}\right)^2\right]$$

On the other hand, another information to be given to the interpolation device 5, that is a peripheral speed $v$ (mm/sec) of the tool, is converted by the following equations (3) and (4) into a rotating speed $\omega_1$ of a $T_1$ shaft driving motor (via a gear of tooth number $i_1$) and a rotating speed $\omega_2$ of a $T_2$ shaft driving motor (via a gear of tooth number $i_2$).

$$\omega_1 = \frac{v}{2\pi \cdot R(\theta)} \times i_1 \quad (3)$$

$$\omega_2 = \omega_1 \frac{i_2}{i_1} \quad (4)$$

Figure 4:
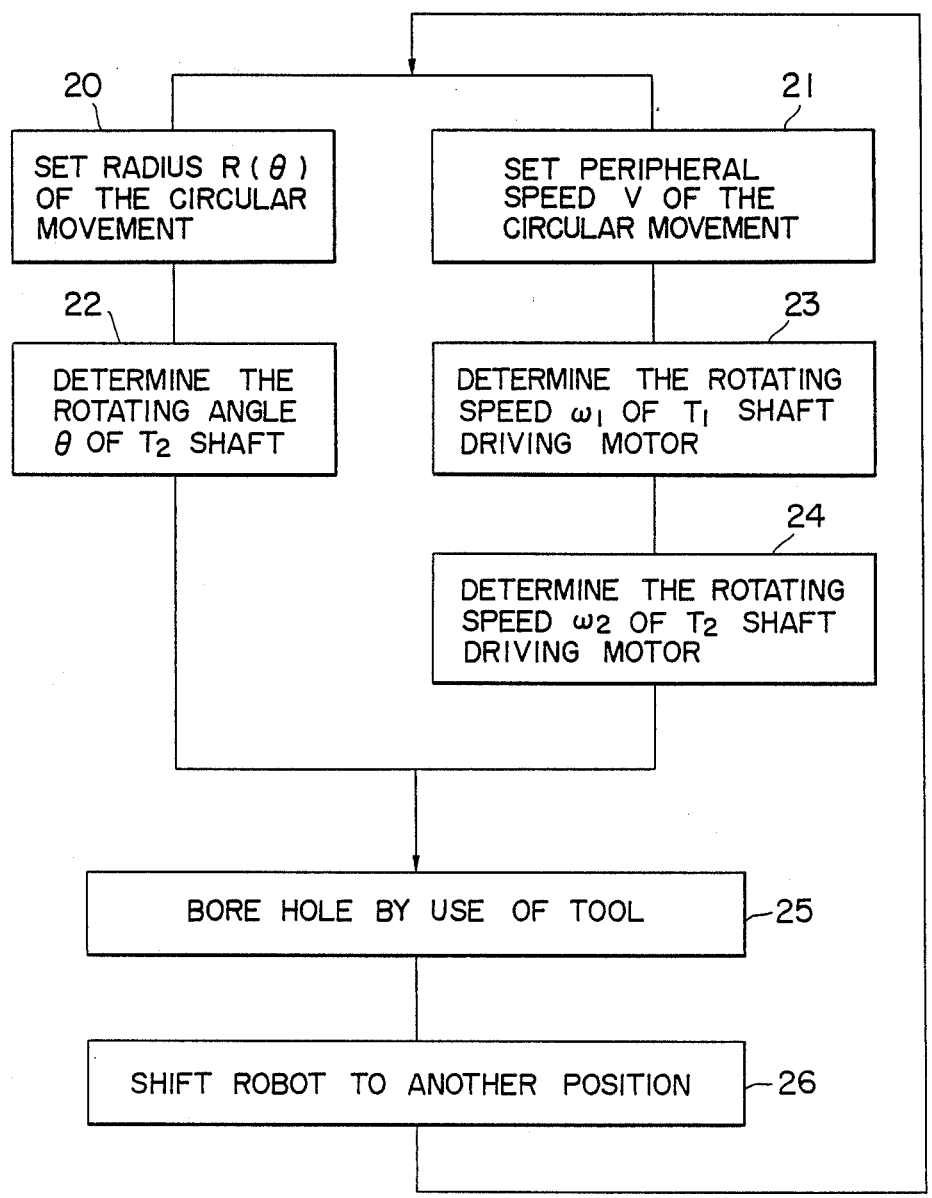
FIG. 4 is a flow chart showing an example of controlling the circular movement.

From the above described relation, the circular movement of the tool can be controlled in accordance with a flow chart shown in FIG. 4. In the control, data related to the radius $R(\theta)$ of the circular movement and the peripheral speed $v$ of the same movement are imparted by the steps 20 and 21. The data related to the radius $R(\theta)$ is converted by use of the equation (2) into a rotating angle $\theta$ of the $T_2$ shaft supporting the tool and the $T_2$ shaft is set to the angular position in the step 22. On the other hand, the data related to the peripheral speed of the tool movement is converted in the step 23 into the rotating speed $\omega_1$ of the $T_1$ shaft driving motor based on the equation (3), and in the step 24, the rotating speed $\omega_1$ is converted into the rotating speed $\omega_2$ of the $T_2$ shaft driving motor based on the equation (4). As a consequence, these motors are operated at rotating speeds $\omega_1$ and $\omega_2$ simultaneously, and the toll is thereby rotated 360° or more so as to form a small hole through the work (in step 25). After the formation of the small hole, the robot shifts the tool in the step 26 to a predetermined position where a subsequent small hole is desired to be formed. The data related to the subsequent small hole are imparted to the control portion of the interpolation device, and the above described steps are repeated for providing the subsequent small hole. As a consequence, the circular movement of the tool can be executed smoothly at a high speed, and hence a small hole of various diameter can be bore accurately regardless of the kind of the tool.

Another case of boring a small hole of a noncircular configuration such as a rectangular or elongated shape will now be described. Since the size of the small hole is varied by direction, not only the center of rotation of the $T_1$ shaft is brought into the origin of the coordinate system as in the case of a circular hole, but also a start point S of the locus movement as shown in FIGS. 5(a) and 5(b) must be taught and memorized by operating the $T_1$ and $T_2$ shafts. That is, the center of rotation of the $T_1$ shaft is brought into coincidence with the center of the noncircular locus movement, and numerical data relating to a longer side A (mm) and a peripheral speed $v$ (mm/sec) are imparted.

The locus forming control will now be described in more detail.

As shown in FIG. 6, the center of rotation of the $T_1$ shaft is selected as the origin C, and a line connecting the origin C and the start point S is defined to be Y axis and a line passing through the origin C and extending perpendicular to the Y axis is defined to be X axis. It is assumed that the locus starting from the point S is directed in parallel with the X axis, and the rotating angles of the $T_1$ shaft and the $T_2$ shaft are designated by $\theta_1$ and $\theta_2$, respectively. Thus the coordinate values X and Y of the tip of the tool 8 are expressed to be $$X = \gamma\cos\theta_1 + \gamma\cos\theta_2 \quad (5)$$

$$Y = \gamma\sin\theta_1 + \gamma\sin\theta_2 \quad (6)$$

On the other hand, the starting point S has been taught, and hence a side B of the locus may be calculated as follows based on the rotating angle $\theta_{02}$ of the $T_2$ shaft at the time the tip is held at the starting point S.

$$B = \gamma \cdot \sqrt{2} \cdot \sqrt{1 - \cos\theta_{02}} \quad (7)$$

By the use of the lengths of the sides A and B, a rectangular or elongated configuration of the locus can be determined.

Herein, since a coordinate calculation of the tip position during each time interval (sec) of the control clock utilizing the peripheral speed $v$ (mm/sec) has been widely known, such calculation is omitted, and only the resultant coordinate values $X_1$ and $Y_1$ are indicated as follows.

$$X_1 = \gamma \cos\theta_1 + \gamma \cos\theta_2 \tag{8}$$

$$Y_1 = \gamma \sin\theta_1 + \gamma \sin\theta_2 \tag{9}$$

From equations (8) and (9), $$X_1 - \gamma \cos\theta_1 = \gamma \cos\theta_2 \tag{10}$$

$$Y_1 - \gamma \sin\theta_1 = \gamma \sin\theta_2 \tag{11}$$

$$X_1 \cos\theta_1 + Y_1 \sin\theta_1 = (X_1^2 + Y_1^2)/2\gamma \tag{12}$$

Figure 7:
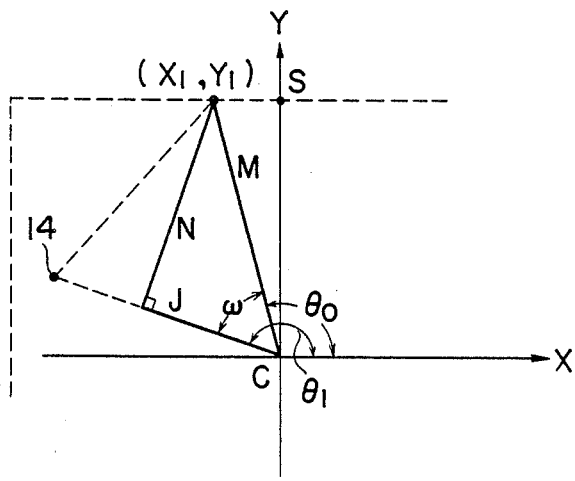
FIGS. 7 and 8 are diagrams adapted for explaining the coordinate values and the rotating angles of the $T_1$ shaft and $T_2$ shaft exhibited at an arbitrary point on the longer side of the noncircular path.
Figure 8:
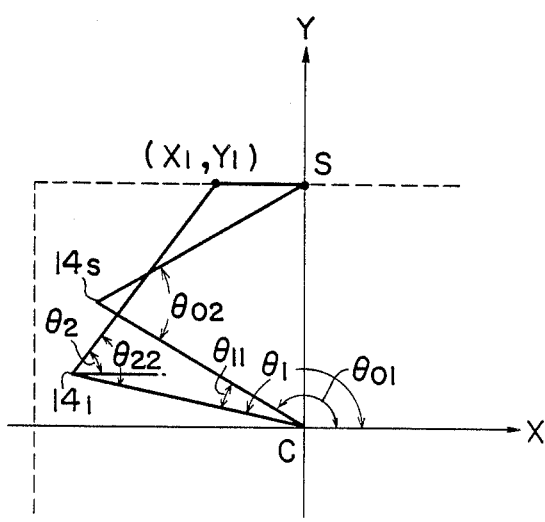

Assuming that
$J = (X_1^2 + Y_1^2)/2\gamma$
$X_1 = M \cos\theta_0$
$Y_1 = M \sin\theta_0$
$M = \sqrt{X_1^2 + Y_1^2}$ and substituting these values in the equation (12)

$$M \cos(\theta_0 - \theta_1) = J$$

$$\cos(\theta_0 - \theta_1) = J/M \tag{13}$$

can be obtained.

when $\omega$ is defined as shown in FIG. 7, $\cos\omega = J/M$ and $\sin\omega = N/m$, and
$\omega = \theta_0 - \theta_1$
$N = -\sqrt{M^2 - J^2}$ and therefore $\tan\omega = N/J$ and $\tan\omega_0 = Y_1/X_1$. Accordingly, $$\begin{aligned}
\tan\theta_1 &= \tan(\theta_0 - \omega) \\
&= \frac{\tan\theta_0 - \tan\omega}{1 + \tan\theta_0 \cdot \tan\omega} \\
&= \frac{Y_1 J - X_1 N}{X_1 J + Y_1 N}
\end{aligned} \tag{14}$$

and $$\theta_1 = \tan^{-1}\frac{Y_1 J - X_1 N}{X_1 J + Y_1 N}$$

Substituting (14) in equations (10) and (11), $$\begin{aligned}
\cos\theta_2 &= (X_1 - \gamma\cos\theta_1)/\gamma \\
\sin\theta_2 &= (Y_1 - \gamma\sin\theta_1)/\gamma \\
\text{thus} & \\
\tan\theta_2 &= \frac{Y_1 - \gamma\sin\theta_1}{X_1 - \gamma\cos\theta_1} \\
\theta_2 &= \tan^{-1}\frac{Y_1 - \gamma\sin\theta_1}{X_1 - \gamma\cos\theta_1}
\end{aligned} \tag{15}$$

Assuming that the rotating angles of the $T_1$ and $T_2$ shafts required for shifting the tool from the starting point S to a position $X_1$ and $Y_1$ are designated by $\theta_{11}$ and $\theta_{22}$, these values can be expressed as follows.

$$\theta_{11} = \theta_1 - \theta_{01} \tag{16}$$

$$\theta_{22} = \theta_2 + 180° - \theta_1 \tag{17}$$

wherein $\theta_{01} = 180° - \tfrac{1}{2}\theta_{02}$.

Figure 9:
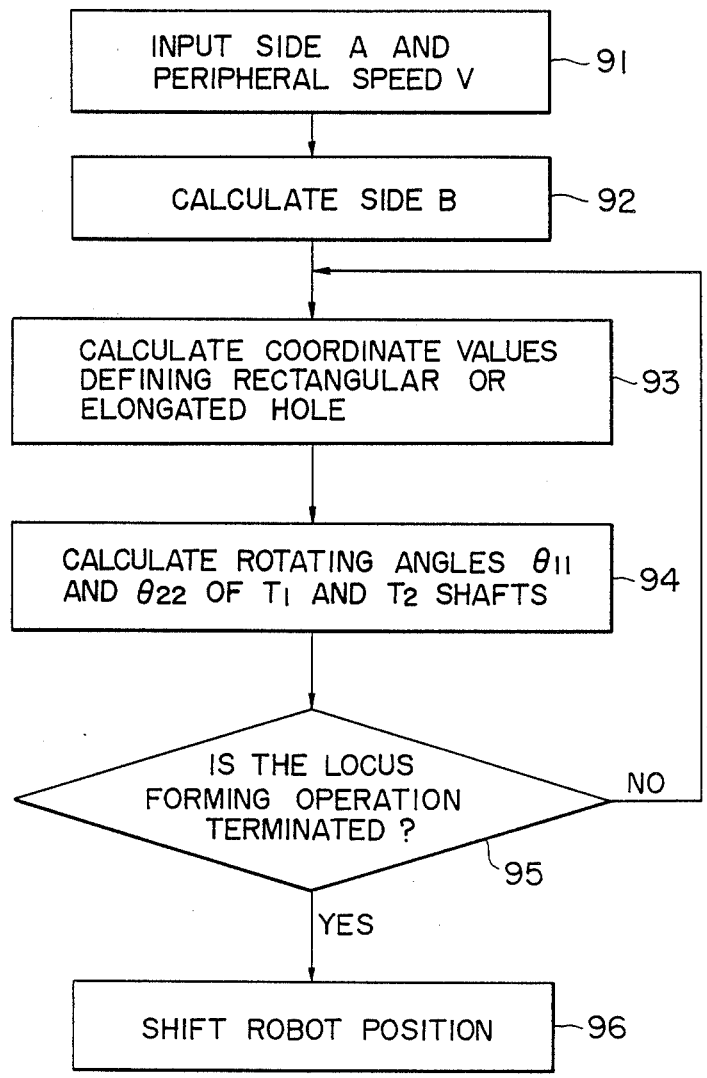
FIG. 9 is a flow chart showing an example of the control of the noncircular hole forming operation.

The locus forming operation for a rectangular or elongated hole is carried out according to the flow chart shown in FIG. 9.

In a step 91 data related to the side A (mm) and the peripheral speed $v$ (mm/sec) of the tool 8 are inputted, while in the step 92, the size of the side B (mm) is calculated by equation (7). In the step 93, coordinate values defining the rectangular or elongated hole are calculated according to equations (8) and (9), and in the step 94, rotating angles $\theta_{11}$ and $\theta_{22}$ of the $T_1$ shaft and $T_2$ shaft are calculated according to equations (14) and (15). The above described coordinate value calculating operation and rotating angle calculating operation in the steps 93 and 94 are repeated until a completion of a locus having a desired noncircular configuration is judged in the step 95, and upon completion of the locus forming operation, the robot is shifted to another position to be prepared for the subsequent hole forming operation.

Thus it is apparent that according to the present invention, when the data such as the peripheral speed of the tool and the radius or the length of a longer side of the locus are imparted as well as the starting point, the tool can be controlled independently from the movement of the robot so that a hole of a circular or noncircular configuration can be formed through a workpiece.

The preferred embodiment of the present invention will now be described with reference to FIGS. 10 through 17.

Figure 10:
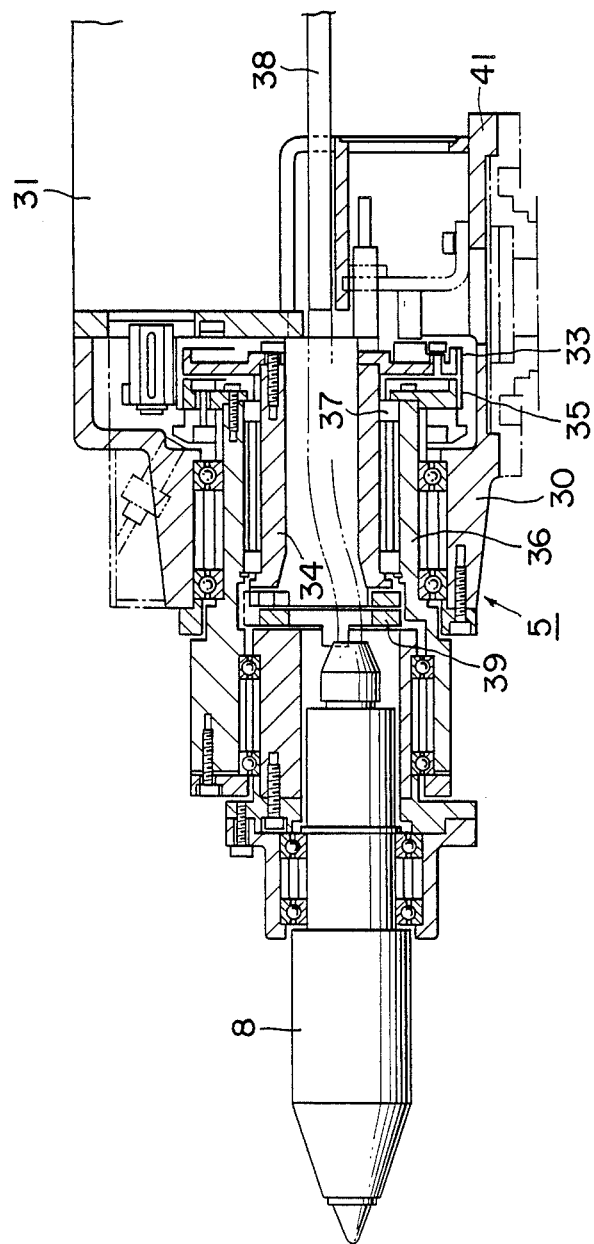
FIGS. 10, 11 and 12 are a sectional view, front view and a rear view of a first embodiment of the present invention.
Figure 11:
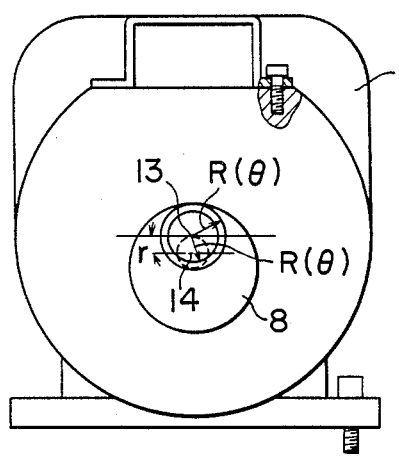
Figure 12:
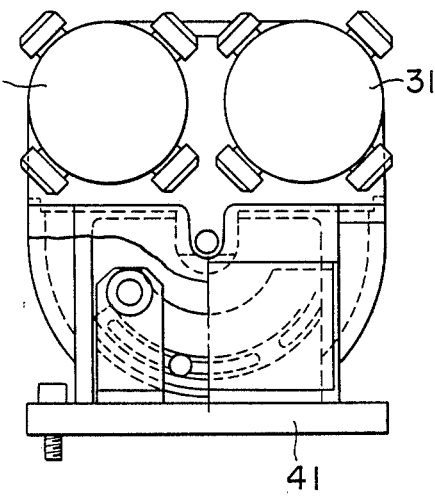
Figure 13:
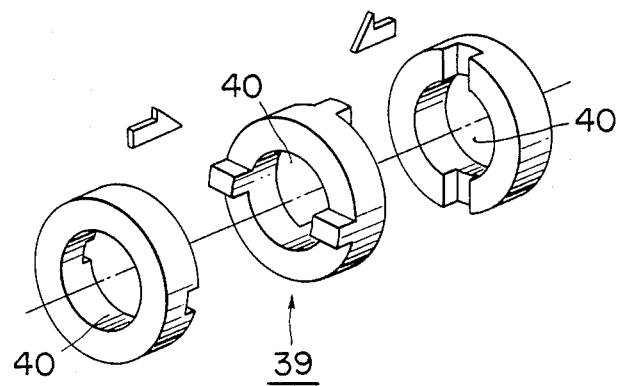
FIG. 13 is an exploded perspective view showing an example of an Oldham coupling.

In a first embodiment shown in FIGS. 10, 11 and 12, motors 31 and 32 for rotating $T_1$ shaft and $T_2$ shaft are provided mutually in parallel on a rear part of a casing 30. The motor 31 rotates a $T_1$ shaft 36 of a hollow construction through a gear 35 while the motor 32 rotates a hollow shaft 34 operable as one part of a $T_2$ shaft driving system through a gear 33. The hollow shafts 34 and 36 are rotatably supported by a plurality of bearings 37 so that the shaft 34 extends through the hollow $T_1$ shaft 36 in a coaxial manner. An eccentric coupling 39 is provided in the $T_2$ shaft driving system so that the coupling 39 rotatably supports a forward shaft member operable as the $T_2$ shaft eccentrically. A tool of, for instance, laser gun is supported by the shaft member of also hollow construction, and cables 38 such as optical fibers which transmit energy to the tool 8 are passed through the shaft member and the hollow shaft 34 to be connected with an energy source. The eccentric coupling 39 may be of Oldham type having a through hole 40 at the center. The aforementioned cables are extended through the central hole 40 into the hollow shaft 34. Numeral 41 designates a flange that secures the locus interpolation device to the wrist of the robot shown in FIG. 1. The locus interpolation device of the above described construction controls the tool 8 according to the principle shown in FIGS. 2 and 6.

Figure 14:
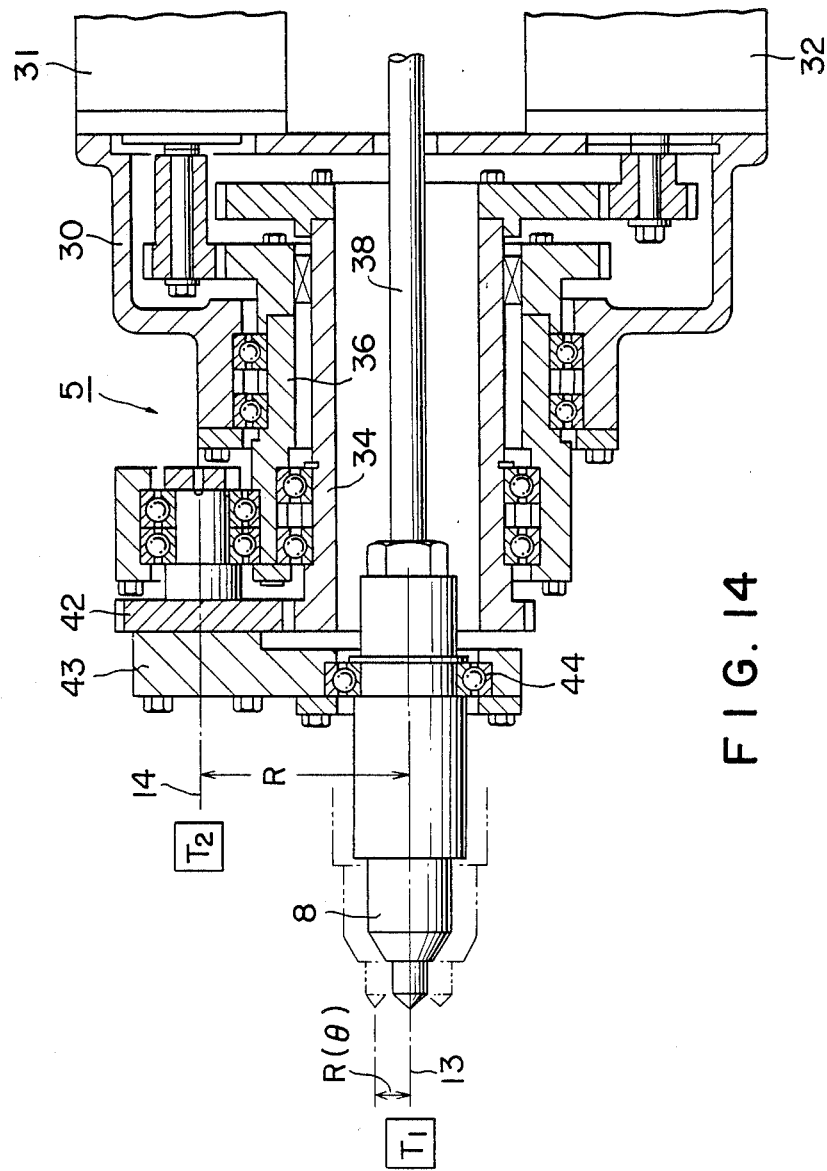
FIGS. 14 and 15 are a sectional view and a front view of a second embodiment of the invention.
Figure 15:
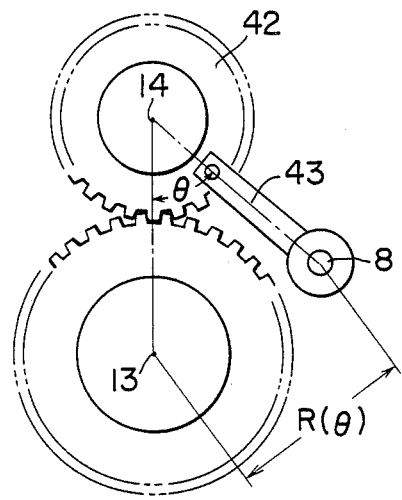

FIGS. 14 and 15 are a sectional view and a front view showing a second embodiment of the present inveniton. In these drawings, members similar to those shown in FIGS. 10, 11 and 12 are designated by similar reference numerals.

A $T_1$ shaft driving motor 31 and a $T_2$ shaft driving motor 32 are secured to a rear end portion of a case 30. A hollow shaft 34 coupled with the $T_2$ shaft driving motor 32 is extended through a hollow shaft 36 coupled with the $T_1$ shaft driving motor 31. A gear 42 is brought into engagement with the forward end of the shaft 34, and an arm 43 is secured by bolts to the gear 42. At an end of the arm 43, a tool 8 is supported through a bearing 44. Accordingly, when the $T_2$ shaft driving motor 32 is energised, the shaft 34 rotates the arm 43 through the gear 42, and therefore the tool 8 is rotated by an angle $\theta$ around the center of rotation 14 of $T_2$ shaft (in this case the center line of the gear 42). By this rotation, the tool 8 is held at a position departed from the center of rotation 13 of $T_1$ shaft by a distance $R(\theta)$ corresponding to the radius of a small hole to be bored. Thus when the $T_1$ shaft driving motor 31 operates, the shaft 36 thereby driven rotates the center line of the gear 42 around the center line of the hollow shaft 36, and the small hole is bored through a workpiece (not shown). A small hole of a rectangular or an oval shape may be formed in a similar manner as described above.

Figure 16:
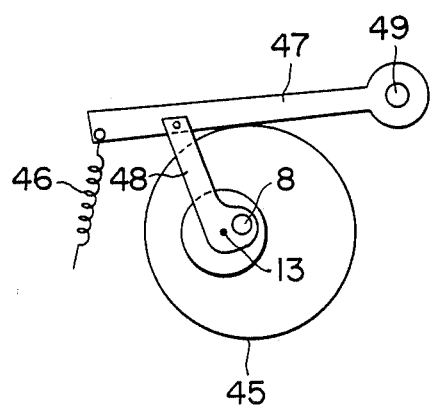
FIG. 16 is a front view showing a third embodiment of the invention.

FIG. 16 illustrates a third embodiment of this invention. In this case, an eccentric cam 45 is secured to an end of the shaft coupled with the $T_2$ shaft driving motor. The function of the cam 45 corresponds to that of the gear 42 of the second embodiment shown in FIG. 15. When the $T_2$ shaft driving motor is operated, the cam 45 is rotated around the center of rotation 13 of the $T_1$ shaft. A lever 47 swingable around a hinge 49 is urged by a tension spring 46 to be depressed onto the outer surface of the eccentric cam 45. A member 48 holding the tool 8 is secured to the lever 47. In operation, the member 48 is swung around the point 49 in accordance with the rotating angle of the eccentric cam 45, so that the radius of rotation of the tool 8 is made equal to the radius of a small hole to be bored, and a circular hole is thereby formed through the workpiece (not shown). It is apparent that a small hole of a rectangular or oval configuration may also be formed in a similar manner.

Figure 17:
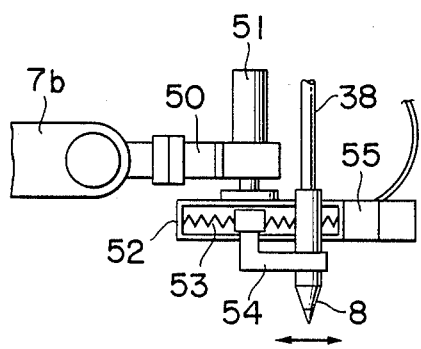
FIG. 17 is a side view of a fourth embodiment of the invention.
Figure 18:
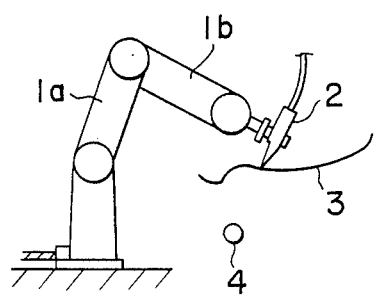
FIG. 18 is a side view of a conventional device for forming a small hole.

FIG. 17 illustrates a fourth embodiment of the invention, the construction of which is far simpler than that of the other embodiments. In this embodiment, a bracket 50 is secured to the wrist of the robot, and a tool rotating motor 51 is secured to the bracket 50. A laterally elongated casing 52 is supported by the rotating shaft of the tool rotating motor 51. within the casing 52, there is provided a feed screw 53 rotated by a radius setting motor 55. A tool holding member 54 holding a tool 8 is thread-engaged with the feed screw 53, and upon rotation of the radius setting motor 55, the radius of the tool rotation is set. Accordingly, when the tool rotating motor 51 is then operated, a small hole of a radius thus set can be bored through the workpiece not shown. It is apparent that a hole of rectangular or oval shape may also be bored by the device according to this embodiment. In this embodiment, however, cables 38 for supplying energy to the tool 8 interfere with the arm 7b of the robot or the bracket 50, and hence a rotation of the tool 8 in excess of 360° is hardly realized, regardless of an advantageous feature that the radius of the hole can be set by a simple mechanism as described above.

According to the present invention, since the operation of the tool for forming a small hole by various shapes such as circle, rectangle or oval can be controlled by simply imparting the data relating to the peripheral speed of the tool shift and the radius and the longer side of the locus to be followed, a small hole of a circular, rectangular or oval shape can be bored accurately at an accurate position regardless of the size and shape of the small hole, and the kind of the tool used for the boring of the hole.

What is claimed is:

1. A locus interpolation device provided at the end of a movable member, said device comprising an operational shaft having an end provided with tool-supporting means, said operational shaft being rotatable about a first rotating center which is eccentric with respect to a tool mounted thereon, a rotating shaft for supporting and rotating said operational shaft, said rotating shaft being rotatable about a second rotating center which is spaced apart from the first rotating center by a predetermined distance, said operational shaft being rotated such that a radial distance between the tool and said second rotating center is made equal to a radius of circular movement of said tool to control the operation of said tool independently from the movement of said movable member in a manner interpolating the locus of circular and noncircular configuration.

2. A locus interpolation device according to claim 1 wherein said operational shaft and said rotating shaft are controlled based on numerical data related to a radius of a circle corresponding to said radius of circular movement of the tool, lengths of a longer side and a shorter side of a non-circular configuration in a manner such that the tool is moved along a desired locus formed around the second rotating center.

3. The locus interpolation device according to claim 2 wherein a driving system for said operational shaft and a driving system for said rotating shaft are provided concentrically, an eccentric coupling is provided in said driving system for said operational shaft, and cables passing through said eccentric coupling for supplying energy to said tool.

4. A locus interpolation device according to claim 3 wherein said operational shaft and said rotating shaft are controlled based on numerical data related to a radius of a circle corresponding to said radius of circular movement of the tool, lengths of a longer side and a shorter side of a non-circular configuration in a manner such that the tool is moved along a desired locus formed around the second rotating center.

5. A locus interpolation device according to claim 1 combined with and mounted on a robot arm.

6. A locus interpolation device according to claim 1 wherein the tool is a cutting gun.

7. A locus interpolation device according to claim 6 combined with and mounted on a robot arm.

* * * * *